United States Patent [19]

Ting

[11] Patent Number: 4,945,131
[45] Date of Patent: Jul. 31, 1990

[54] CONTROL OF SURFACE GLOSS BY VARIATION OF HIPS RUBBER SWELL INDEX IN POLYPHENYLENE ETHER COMPOSITION

[75] Inventor: Sai-Pei Ting, Delmar, N.Y.

[73] Assignee: General Electric Company, Selkirk, N.Y.

[21] Appl. No.: 817,903

[22] Filed: Jan. 10, 1986

[51] Int. Cl.$^5$ ................................................ C08L 7/12
[52] U.S. Cl. ...................................... 525/68; 525/905
[58] Field of Search ................................. 525/68, 905

[56] References Cited

U.S. PATENT DOCUMENTS 4,371,663  2/1983  Russell .................................. 525/95
4,448,931  5/1984  Sugio et al. ........................... 525/68

Primary Examiner—Jacob Ziegler
Attorney, Agent, or Firm—Hedman, Gibson, Costigan & Hoare

[57] ABSTRACT

The surface gloss and flexural modulus of articles molded from blends of a polyphenylene ether resin and a rubber modified, high impact polystyrene (HIPS) are regulated by controlling the swell index of the HIPS rubber within the range of 8 to 20. Duller surface finishes and higher flexural moduli are achieved with use of higher swell indices, while glossier surfaces and lower flexural moduli are obtained with lower swell indices within this range.

9 Claims, No Drawings

CONTROL OF SURFACE GLOSS BY VARIATION OF HIPS RUBBER SWELL INDEX IN POLYPHENYLENE ETHER COMPOSITION

BACKGROUND OF THE INVENTION

1. Field of the Invention

This invention relates to compositions of a polyphenylene ether resin and a rubber modified, high impact polystyrene (HIPS) and, more specifically, to such blends in which the swell index of the HIPS rubber phase is regulated to control the surface gloss of the blend after molding.

2. Description of the Prior Art

For some time now, mixtures of polyphenylene ether resin and rubber modified, high impact polystyrene resin have enjoyed increasingly wider commercial use in industry, the household and in personal care products. Plastic items molded from such compositions are durable and exhibit additional properties that make them good substitutes for articles previously manufactured from more conventional materials such as metal, wood and ceramics. Because of the variety of applications, the compositions are usually formulated according to specific requirements. For instance, in some cases customer needs dictate that the product exhibit a matte, or relatively dull, finish. In still other cases a glossy or very shiny finish may be desired.

Manufacturing techniques have been developed to regulate the surface gloss of such molded products with reasonable accuracy. For instance, it is known that the surface gloss of molded parts can easily be lowered by increasing the size of the HIPS rubber particles used in the composition. Reducing the mold temperature during the injection molding cycle is another way of achieving this same result. However, both techniques have their shortcomings. The use of larger particle size rubber usually results in significant decreases in the notched Izod impact strength of the molded part. On the other hand, the use of lower mold temperatures can and often does markedly reduce the stress cracking resistance. Both properties are important and relate directly to the durability and toughness of the molded part.

SUMMARY OF THE INVENTION

The discovery has now been made that if the rubber swell index of a high impact polystyrene in a blend with a polyphenylene ether resin is regulated to be within a certain range, specifically 8 to 20, the surface gloss of the molded composition can be controlled accordingly.

More particularly, it has been found that the surface gloss varies inversely with the rubber swell index, such that higher glosses are achievable with the use of high impact polystyrenes having lower rubber swell indices within this range. Conversely, duller surfaces are achieved by using high impact polystyrenes in which the rubber has higher swell index values within the range. An additional unexpected benefit is that the flexural modulus values of the molded compositions can also be regulated, with a higher modulus being achieved when a higher swell index is used. Moreover, these accomplishments occur without any significant losses in other important properties.

The swell index mentioned in this invention is defined by the weight ratio of wet gel versus dry gel; the gel being the insoluble portion in toluene solvent. Detailed procedures of measuring swell index will be described in the specific embodiments.

The present invention provides an alternative to conventional polyphenylene ether-high impact polystyrene blends in which the after-molding surface gloss is influenced by the selection of HIPS according to the rubber particle sizes. The present kinds of blends in fact offer a better approach, by enabling control of the gloss without any harmful reduction in the Notched Izod impact strength, and thus avoiding the prior art shortcoming.

DESCRIPTION OF THE INVENTION

Briefly described, the present invention thus involves, in one of its aspects, a thermoplastic composition comprising (a) a polyphenylene ether resin; and (b) a rubber modified, high impact polystyrene resin, in which the rubber is characterized by a swell index in the range of 8 to 20, the surface gloss of the compositions after molding varying inversely with the swell index.

Another aspect of the present invention concerns articles molded from such compositions.

Still another aspect of the present invention involves a method of controlling the surface gloss of a molded thermoplastic composition of (a) a polyphenylene ether resin and (b) a rubber modified, high impact polystyrene resin by regulating the swell index of the rubber in the polystyrene within the range 8 to 20 in inverse proportion to the desired gloss.

The polyphenylene ethers(also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

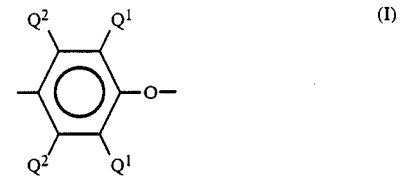

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3- dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.45 to 0.5 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (both monomeric and polymeric), o-hydroxyaryl oximes, and β-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

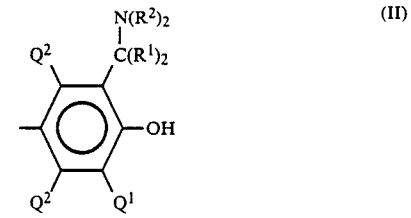

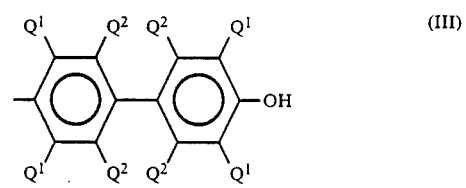

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in impact strength and compatibilization with other blend components.

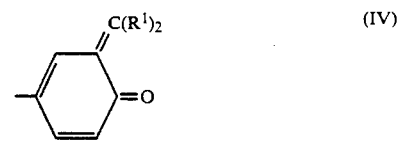

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

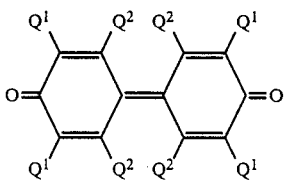

(V)

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The polystyrene resin used for component (b) may be prepared from styrene itself, or from any of the analogs or homologs thereof suitable for use in styrene polymerization, and particularly compounds of the formula

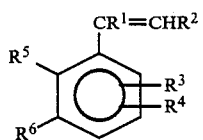

wherein $R^1$ and $R^2$ are independently selected from the group consisting of lower alkyl or alkenyl groups of from 1 to 6 carbon atoms, and hydrogen; and $R^3$, $R^4$, $R^5$ and $R^6$ are independently selected from the group consisting of chloro, bromo, hydrogen and lower alkyl or alkenyl groups of from 1 to 6 carbon atoms. Examples include alpha-methyl styrene, para-methyl styrene, 2,4-dimethyl styrene, chlorostyrene, dichlorostyrene, bromostyrene, dibromostyrene, para-tert-butyl styrene, and para-ethyl styrene.

Any of the rubbers known to be useful in the formation of rubber modified, high impact polystyrene can be used, including polybutadiene, polyisoprene, ethylene-propylene copolymers (EPR), ethylene-propylenediene (EPDM) rubber, styrene-butadiene copolymers (SBR), polyacrylates, and so forth.

Principal preferred characteristics of the high impact polystyrene (or HIPS) which constitutes component (b) of the present compositions include a rubber content from 5 to 20 percent by weight, based on the total weight of this component (that is, 100 percent weight of the polystyrene resin and rubber modifier content combined). Also preferably, the rubber modifier is comprised of a particulate rubbery phase in which the average size of the particles is in the range from 0.5 to 4.0 microns ($\mu$) in diameter.

The relative proportions of components (a) and (b) in the composition can vary widely, as is conventional for such types of blends. Typically, the weight ratio of component (a) to component (b) will vary within the range of 95:5 to 5:95, based on 100 percent by weight of these two combined.

The compositions in accordance with the present invention can be, and usually are, formulated to contain one or more additional ingredients, typically selected from among conventional additives for polyphenylene ether resin compositions. Illustratively, these include plasticizers, flame retardants agents, stabilizers, antioxidants, mold release agents, coloring agents, processing aids, mineral fillers, and glass reinforcing agents. Conventional amounts, ranging from less than 1 to greater than 50 percent by weight, based on 100 percent by weight of the total composition, may be employed.

Preparation of the compositions can be accomplished conveniently by forming a mixture of the ingredients, either by dry, melt or solution blending. Preferably, the mixture is then compounded by passage through an extruder and cutting the cooled extrudate into molding pellets or tablets.

The compositions are useful for the same purposes as conventional polyphenylene ether-HIPS blends and can be made into a wide variety of injection molded articles and parts.

DESCRIPTION OF THE SPECIFIC EMBODIMENTS

The invention is further illustrated in the following examples, which are intended to show best or preferred embodiments.

EXAMPLES 1-5

Blends in accordance with the present invention were prepared using 50 parts by weight of poly (2,6-dimethyl-1,4-phenylene ether) resin (PPO ®, General Electric Co.), 50 parts by weight of rubber modified, high impact polystyrene (HIPS), 14.5 parts by weight of isoprdpylated triphenyl phosphate (Kronitex-50, FMC Corp.), 1.5 parts by weight of polyethylene, 0.5 part by weight of tridecyl phosphite, 0.5 part by weight of zinc oxide and 0.15 part by weight of zinc sulfide. The ingredients were extruded through a 28 mm Werner-Pfleiderer twin-screw extruder using a temperature profile of 350, 400, 500, 550, 550, 550° F., then molded into standard test pieces using a 3-ounce Newbury injection molding machine, a melt temperature of 500° F., and a mold temperature of 150° F.

Five blends were thus prepared, and then tested for physical properties. A different high impact polystyrene (HIPS) was used in each blend, as identified in Tables 1 and 2. These materials were carefully chosen to maintain all significant characteristics the same, except for the swell index.

The swell indices of the various HIPS were measured by the following procedures:

1. Dissolve 0.6 gram of HIPS in 20-25 milliliters of toluene; place in shaker overnight.
2. Spin the toluene solution in a high sped centrifuge for 70 minutes at maximum rpm (17,000).
3. Pour off the toluene supernatant, then weigh the wet gel.
4. Place the wet gel in a vacuum oven at 70°-80° C. with 10-15 inches of vacuum. Allow to stand for 4 hours until dry. Weigh the dry gel.
5. Calculate the swell index value, as follows:

$$\text{Swell Index} = \frac{\text{wt. of wet gel}}{\text{wt. of dry gel}}.$$

Stress cracking resistance (SCR) means the degree of resistance to mold-in stress relaxation when the molded parts are heated at a temperature of about 50°-60° F.

higher than their heat distortion temperature (HDT). The SCR data reported in Table 2 were the average values of total cracking length observed in the edges of five molded specimens (200×3×5 mm³ in size) after the specimens were thermally aged in an oven at a temperature of 250° F. for 20 minutes. The lower value means better stress cracking resistance. Results in Table 2 indicate that the SCR of PPO/HIPS blends are not notably affected by varying the rubber swell index providing the other HIPS characteristics remain the same.

The influence of HIPS rubber swell index on the gloss and the flexural modulus of the PPO/HIPS blends are clearly demonstrated. By simply altering the HIPS rubber swell index, one can easily vary the gloss and rigidity (flexural modulus) of PPO/HIPS blends to a certain extent without notably affecting other important properties such as heat distortion temperature, impact strength and stress cracking resistance.

TABLE 1
Characteristics of Two Series of HIPS Having Different Rubber Swell Indices

| Example | HIPS | Mn | Mw | % Rubber | Swell Index | Rubber Particle No. Avg. | Size (μ)* Vol. Avg. |
|---|---|---|---|---|---|---|---|
| 1 | Monsanto 57-1 | 67,000 | 214,000 | 9.6 | 11.9 | 0.69 | 1.83 |
| 2 | Monsanto 57-2 | 67,600 | 219,000 | 9.7 | 14.0 | 0.69 | 2.05 |
| 3 | Monsanto 57-3 | 69,500 | 231,000 | 9.9 | 17.9 | 0.69 | 2.06 |
| 4 | Mobil MX-7500C | 58,000 | 190,000 | 10.4 | 9.3 | 1.07 | 1.93 |
| 5 | Mobil MX-7500O | 57,200 | 192,000 | 10.6 | 13.5 | 1.01 | 2.10 |

*Measured by Coulter Counter Particle Size Analyzer

TABLE 2
Physical Properties of Blends OF PPO ® with HIPS having various swell indices

| Example | HIPS S.I. | HDT, °F. | Izod ft.lb./in.n | Dynatup in.lb | Flex. Mod., psi | Gloss, 45° | SCR(cm) |
|---|---|---|---|---|---|---|---|
| 1 | 11.9 | 185 | 5.0 | 156 | 359,000 | 49 | 6.0 ± 2.6 |
| 2 | 14.0 | 186 | 4.4 | 112 | 363,000 | 44 | 5.9 ± 0.8 |
| 3 | 17.9 | 189 | 4.3 | 138 | 388,000 | 37 | 7.4 ± 1.7 |
| 4 | 9.3 | 189 | 5.3 | 236 | 333,000 | 58 | 4.7 ± 1.7 |
| 5 | 13.5 | 183 | 4.1 | 164 | 347,000 | 50 | 5.0 ± 2.1 |

HDT = Heat Distortion Temperature
Izod = Notched Izod Impact Strength
Dynatup = Dynatup Impact Strength
Flex. Mod. = Flexural Modulus
SCR = Stress Cracking Resistance (average value ± deviation)

The invention may be further modified from the particular embodiments shown without departing from its scope or sacrificing its principles. Thus, for instance, instead of a homopolymer such as poly(2,6-dimethyl-1,4-phenylene ether) resin, a copolymer such as poly(2,6-dimethyl-co-2,3,6-trimethyl-1,4-phenylene ether) resin can be used. Moreover, the compositions can be reformulated to include clay or glass fillers and/or conventional flame retardant agents, as already indicated. Still other variations will occur in the light of the foregoing description which are embraced within the boundaries of the appended claims.

I claim:

1. A method of controlling the surface gloss of a molded composition of (a) a polyphenylene ether resin and (b) a rubber modified, high impact polystyrene comprising regulating the rubber swell index of the rubber in component (b) from about 9.3 to about 17.9 to vary the surface gloss after molding from about 37 to about 58 in inverse proportion to the swell index.

2. A method according to claim 1, in which component (b) has a rubber content from 5 to 20 percent by weight.

3. A method according to claim 1, in which component (b) is characterized by a particulate rubber phase where the average of the rubber particles is from 0.5 to 4.0 microns.

4. A method according to claim 1, in which the weight ratio of component (a) to component (b) varies in the range of 95:5 to 5:95, based on 100 percent by weight of these two components combined.

5. A method according to claim 1, in which the polyphenylene ether resin, component (a), has the formula

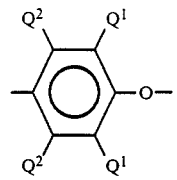

in which in each of these units independently each $Q^1$ is hydrogen, halogen, primary or secondary lower alkyl containing up to 7 carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

6. A method according to claim 1, in which the polyphenylene ether resin is poly(2,6-dimethyl-1,4-phenylene ether).

7. A method according to claim 1, in which the poly(2,6-dimethyl-1,4-phenylene ether) has an intrinsic viscosity in the range of about 0.40 to 0.5 deciliters per gram in chloroform at 25° C.

8. A method according to claim 1, in which the polyphenylene ether resin is poly(2,6-dimethyl-co-2, 3,6-trimethyl-1,4-phenylene ether).

9. A method according to claim 1, which includes one or more additional ingredients selected from among plasticizers, flame retardant agents, stabilizers, antioxidants, mold release agents, coloring agents, processing aids, mineral fillers, and glass reinforcing agents.

* * * * *